Nov. 21, 1967  W. J. HILL  3,353,818
HOLD-DOWN AND CLAMPING APPARATUS
Filed July 2, 1964  3 Sheets-Sheet 1

INVENTOR.
William J. Hill
BY
Russell, Chittick & Pfund
Attorneys

Nov. 21, 1967 W. J. HILL 3,353,818
HOLD-DOWN AND CLAMPING APPARATUS
Filed July 2, 1964 3 Sheets-Sheet 2

INVENTOR.
William J. Hill
BY
Russell, Chittick & Pfund
Attorney

United States Patent Office 3,353,818
Patented Nov. 21, 1967

3,353,818
HOLD-DOWN AND CLAMPING APPARATUS
William J. Hill, Holden, Mass., assignor to Morgan Construction Company, Worcester, Mass., a corporation of Massachusetts
Filed July 2, 1964, Ser. No. 379,922
5 Claims. (Cl. 269—153)

This invention relates to apparatus for handling elongated elements and more particularly to a means for securely retaining articles such as bars, angles, rods, etc. in fixed laterally adjacent positions on a common supporting surface.

Reference will hereinafter be made to a rolling mill in describing the present invention. It should, however, be understood that the inventive concepts to be disclosed will be applicable wherever one or more laterally adjacent elongated elements are to be held in place on a common supporting surface while being worked upon.

In a rolling mill, products of the aforementioned type are usually formed into continuous elongated elements such as bars by subjecting heated billets to conventionally known rolling operations. The weight of each element emerging from the finishing stands approximates that of the original billet, making its total length greater than that desired for subsequent shipment to consumers. Consequently, a cutting operation must usually be performed to subdivide each element into shorter uniform lengths which may then be more efficiently bundled, stored and shipped. The conventional practice in performing the cutting operation is to first collect the elongated elements in laterally adjacent positions on a common elongated supporting surface. Thereafter, they are held in place by various types of hold-down apparatus and cut by a saw mechanism designed to operate in a direction transverse to the length of the articles being cut.

The accuracy of the cutting operation which in turn governs uniformity of the finished product being produced, will depend to a great extent on efficient operation of the hold-down and clamping apparatus. More particularly, longitudinal movement of the elements while the cutting operation is in progress will result in the formation of an end product of nonuniform length. Moreover, should the elements shift in a transverse direction under the influence of the cutting blade, the quality of the cut will be adversely affected. Still further, experience has shown that even slight movement of the elements while the cutting operation is in progress may cause blade binding and breakage.

These difficulties are compounded by the fact that spaces usually exist between each laterally adjacent element after they have been brought to rest on the supporting surface adjacent the cutting blade. To insure positive retention of the elements in a fixed position during the cutting operation and to counteract the forward cutting motion of the blade, hold-down mechanisms presently in use usually include means for initially "crowding" the elements against a fixed stop extending upwardly from the supporting surface prior to exerting a downward holding action thereon.

The aforementioned difficulties have now been obviated in a novel manner by the present invention, a general object of which is to provide an improved means of positively retaining elongated elements, including those having irregular cross-sectional configurations, on a common supporting surface.

Another object of the present invention is to provide a greatly simplified hold-down mechanism capable of effectively preventing transverse shifting of the elongated elements during a cutting operation.

A further object of the present invention is to provide a means of temporarily holding elongated elements in place on a supporting surface without necessitating a preliminary transverse shifting or crowding thereof to positions abutting fixed stops.

A further object of the present invention is to provide a hold-down mechanism capable of exerting a downward holding force on each individual element while simultaneously preventing movement thereof in a transverse direction.

These and other objects of the present invention will become more apparent as the description proceeds with the aid of the accompanying drawings in which.

Figure 1:
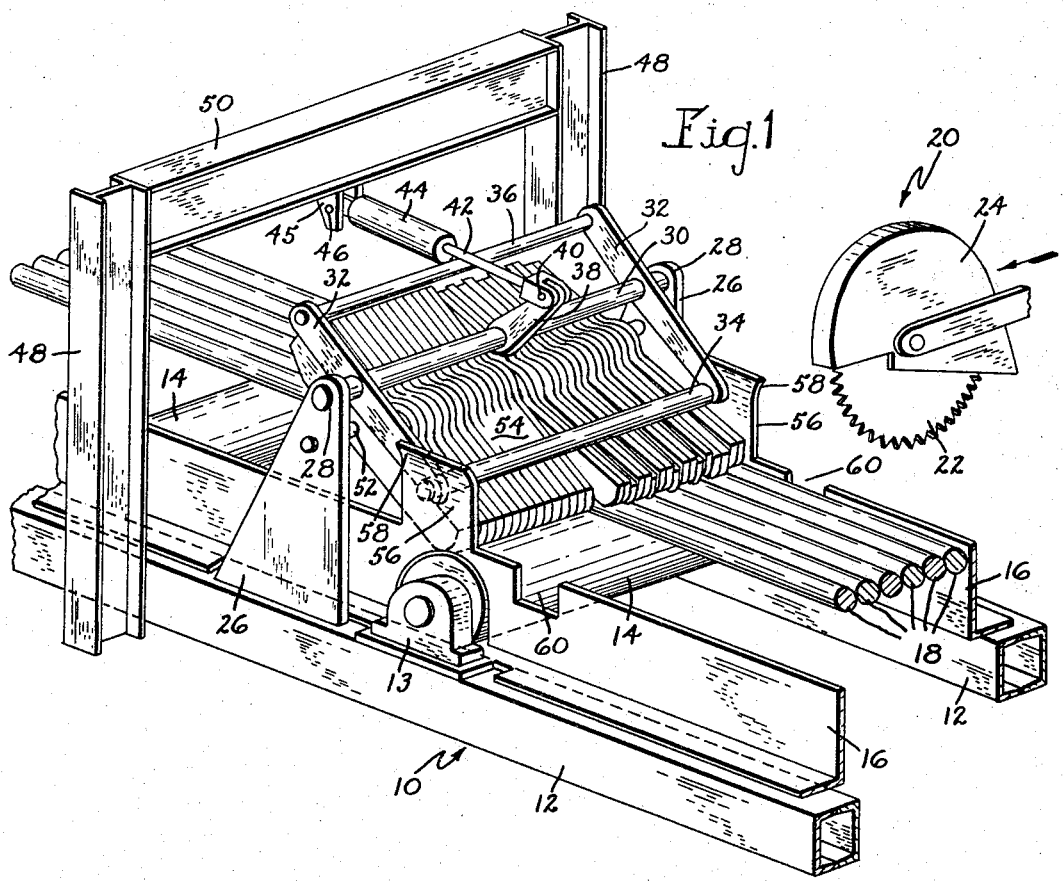
FIG. 1 is a partially schematic view in perspective of a preferred embodiment of the hold-down apparatus according to the present invention utilized in connection with a runoff table and hot saw of the type commonly found in rolling mills.
Figure 2:
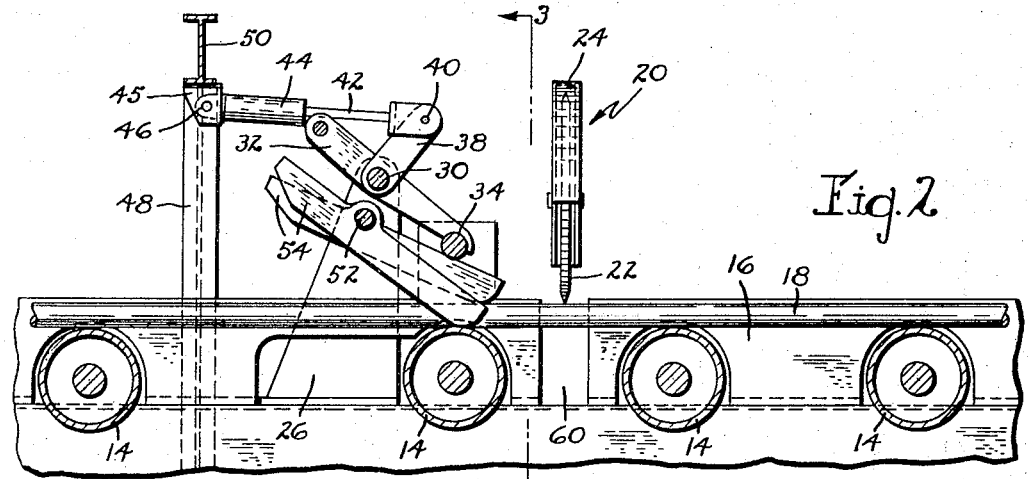
FIG. 2 is a sectional view in elevation taken slightly off-center of the hold-down apparatus which has been pivoted to a downwardly disposed operative position.
Figure 3:
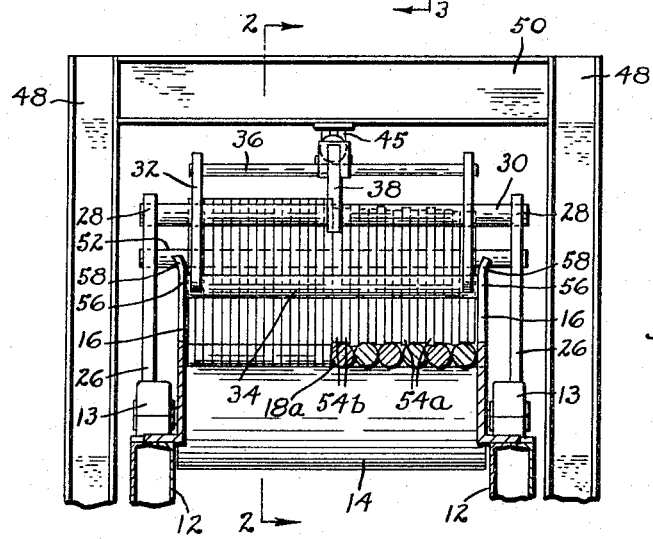
FIG. 3 is a sectional view through the runoff table taken along line 3—3 of FIG. 2 showing an end view of the apparatus in its operative position.

Referring initially to FIGS. 1–3 wherein are best shown general features of the invention, a runoff table of conventional construction is generally referred to by the reference numeral 10. In a rolling mill, tables of this type extend from the rolling operation past cutting apparatus to bundling mechanisms where the finished produce is bundled and transferred to storage areas prior to being shipped to customers. The runoff table 10, the particular construction of which is not a necessary part of the present invention, is comprised basically of parallel beams 12 supporting opposed bearings 13. Transverse table rollers collectively referred to by the reference numeral 14 are journaled for rotation between bearings 13 to define the supporting surface of the table. Although not shown, it should of course be understood that some of the table rollers are driven in a conventional manner for rotation in either a clockwise or counterclockwise direction to provide a means for moving the stock along the table. Side guards 16 are further provided on either side of the table to insure containment of stock thereon. Stock, herein shown in the form of round bars 18, travels longitudinally over the table rollers 14 until brought to rest by end engagement with a transverse downstream stop member (not shown) of conventional construction. In this manner, the front ends of each bar 18 are aligned accurately in preparation for the cutting operation to be hereinafter described.

Once the desired number of bars 18 have been accumulated on roller table 10 and brought to rest by engagement with the aforementioned downstream stop member, they must then be held in place while being subdivided by a cutting mechanism. For purposes of illustration, one embodiment of a conventional cutting mechanism generally indicated by the reference numeral 20 has been diagrammatically illustrated in FIGS. 1 and 2 in the form of a rotatable saw blade 22 partially enclosed by a protective hood member 24. The saw is driven by conventional means and movably supported to operate through a cutting cycle extending across the roller table at right angles thereto.

With the cutting cycle completed, the downstream stop member is then moved to an inoperative position and the stock transferred further downstream for bundling. This is usually accomplished by simply driving some of the table rollers in any known conventional manner.

A preferred embodiment of the hold-down apparatus to which the present invention is primarily directed and which is used in retaining the stock in a fixed position on runoff table 10 during the cutting operation will now be described in detail. Opposed vertical supporting standards 26 extend upwardly from beams 12 to provide means as at 28 for pivotally mounting the ends of a transverse central shaft 30. Spaced parallel links 32 are fixed to shaft 30 adjacent the point of pivotal connection to supporting standards 26, their ends in turn joined by front and rear transverse pressure bars 34 and 36.

A relatively short operating link 38 is fixed to central shaft 30 at its approximate midsection, the upper end of link 38 being pivotally attached as at 40 to the extensible piston rod 42 of cylinder 44. The rear end of cylinder 44 is in turn pivotally connected as at 46 by means of a depending bracket 45 to a stationary frame structure comprised of uprights 48 and an overlying cross beam 50.

In view of the foregoing, it should now be apparent that by extending piston rod 42, shaft 30 will be pivoted in a clockwise direction, causing front pressure bar 34 to tilt downwardly as rear pressure bar 36 is simultaneously tilted in an upward direction. Retraction of piston rod 42 will of course impart a reverse effect.

In addition to rotatably supporting the ends of central shaft 30, vertical standards 26 also support the ends of a second nonrotatable transverse shaft 52 which extends in parallel relationship to shaft 30. A plurality of laterally adjacent links hereinafter referred to as "finger members 54" are pivotally supported by shaft 52 and are capable of either clockwise or counterclockwise motion about its longitudinal axis. In the preferred embodiment of the invention, the center of gravity of each finger member 54 is positioned forward of its point of pivotal connection to shaft 52 to provide an overbalancing effect. In this manner, the front portion of each finger member will have a tendency to pivot downwardly under the influence of gravity in a clockwise direction about shaft 52.

The downward pivotal motion of some of the finger members will ultimately be arrested when their forward ends come into contact with elongated elements such as bars 18 at rest on the table supporting surface formed by rollers 14. The remaining finger members which overlie unoccupied portions of the table will be depressed still further until they contact the roller surface. This condition is clearly illustrated in FIGS. 3 and 6 where it can be seen that some of the finger members actually occupy the depressions formed by the contour of the stock.

Figure 4:
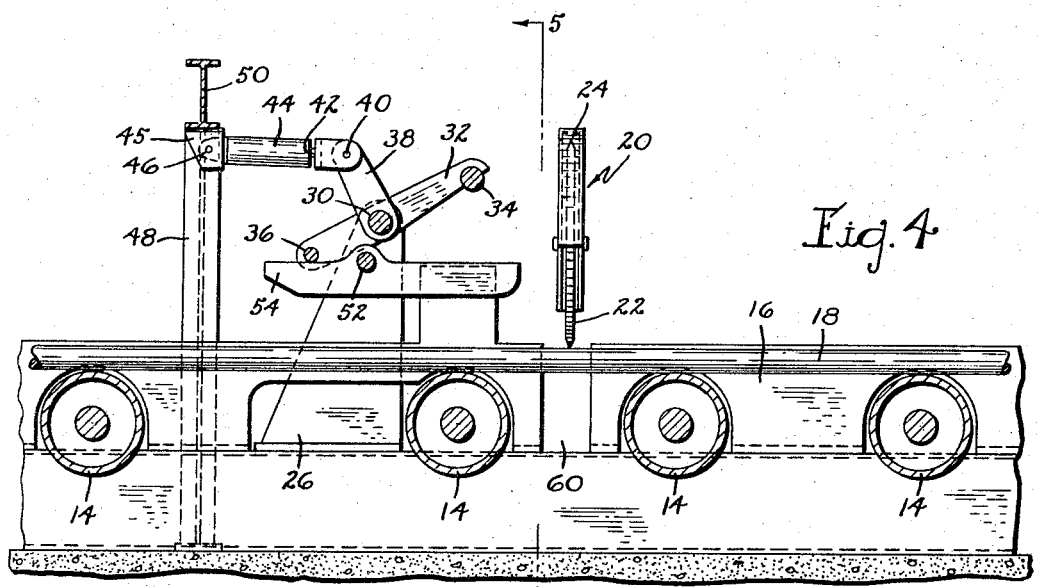
FIG. 4 is a sectional view similar to FIG. 2 showing the apparatus pivoted to an upwardly disposed inoperative position.
Figure 5:
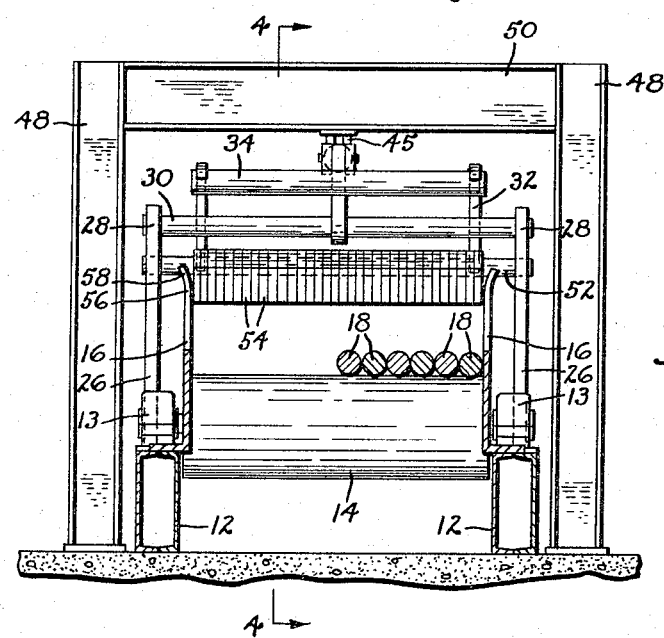
FIG. 5 is a sectional view taken along line 5—5 of FIG. 4.

Having thus described the principal components of the invention, its operation will now be reviewed in connection with the subdivision of bars by a conventional saw mechanism of the type illustrated. As shown in FIGS. 4 and 5, extensible piston rod 42 has been retracted to cause rotation of central bar member 30 in a counterclockwise direction. By so doing, the rear transverse pressure bar 36 has been brought into contact with the rear ends of finger member 54, causing them to pivot in a corresponding counterclockwise direction about shaft 52. When piston rod 42 is fully retracted, the finger members are pivotally raised to an inoperative position above the underlying table rollers.

At this point, bars 18 are fed longitudinally along table 10 and allowed to engage a downstream stop member as previously discussed. When a sufficient number of bars has been collected on the table, piston rod 42 is extended to cause clockwise rotation of shaft 30. This in turn raises rear transverse pressure bar 36 and allows the front portions of finger members 54 to drop under the influence of gravity.

As the front ends of finger members 54 drop to their lowermost position, some of them will engage the bars while the remaining fingers continue to be lowered until they arrive in contact with the underlying table roller 14. An important advantage is derived from this relationship. More particularly as can be best seen in FIG. 3, the finger members which eventually contact roll 14 serve as intermediate pieces which fill any unoccupied roll portions between the two upstanding table side guards 16. In this connection, it should be noted that each side guard 16 is provided with an upstanding portion 56 bent outwardly to form a gradually flared portion 58. With this construction, the outermost finger members 54 are prevented from being caught during their downward pivotal displacement about shaft 52 by the upper edges of the side guards. Moreover, each side guard is notched as at 60 to permit transverse movement of saw mechanism 20 during a cutting operation. By filling the entire space between side guards 16 with either stock or finger members, any subsequent transverse shifting of the stock during the cutting operation is effectively prevented.

Figure 6:
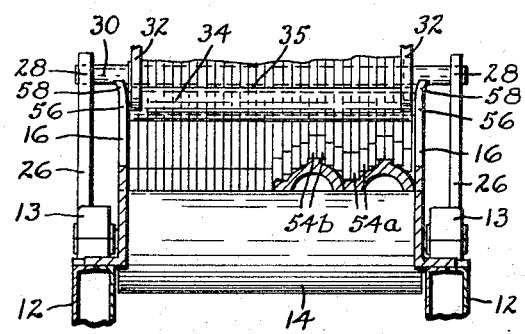
FIG. 6 is a partial sectional view similar to FIGURES 3 and 5 showing the finger members exerting a holding action on elongated elements having irregular cross sections.

It should also be noted that the remaining finger members which arrive in contact with the bars assume a pattern closely approximating the contour created by cross-sectional shapes of the bars. More particularly, some finger members such as those indicated by the reference numeral 54a (FIG. 3) will drop between adjacent bars to the approximate point of tangency therebetween. Other finger members will arrive in contact with higher portions of adjacent bars with some as indicated at 54b raised above the others by virtue of the particular cross section of the product being retained. In FIG. 3, all finger members to the left of bar 18a are in contact with roller 14 and serve as filler pieces. The remaining finger members have settled on the bars in the aforementioned random fashion. FIG. 6 is a view similar to FIG. 3 showing the effect provided where irregularly shaped sections are being held by the finger members.

As extension of piston rod 42 continues, the forward pressure bar 34 will be pivoted downwardly in a clockwise direction until brought into contact with selected finger members. More particularly, since bar 34 is a substantially straight member, it will contact only those finger members raised to a maximum elevation by virtue of the particular cross-sectional configuration of the product being held. Where round bars are being held, finger members 54b which engage the maximum diameter of each bar will therefore be contacted by pressure bar 34.

A modification of the invention is shown in FIG. 6 in the form of a tubular sleeve member 35 surrounding transverse pressure bar 34 between spaced parallel links 32. The sleeve, which may be fabricated of any suitable resilient material such as hard rubber, serves as a relatively pliable intermediate buffer for evenly applying the downward holding action of pressure bar 34 to each raised finger member. This modification insures a relatively uniform application of the downward holding force which might otherwise be upset by minute variations in stock elevation in turn caused by a camber in one or more of the laterally adjacent elongated elements.

As piston rod 42 reaches the end of its stroke, a downward holding force will be imparted to each piece of stock at rest on roller table 10. Transverse movement of the stock during application of this force will be effectively prevented by the closely adjacent finger members which fill all unoccupied portions of the table and in addition, assume a random configuration which closely approximates that of the stock. With the stock so held, saw mechanism 20 is simply advanced in a transverse direction to effectuate a cut, thereby severing each piece of stock. Following withdrawal of the saw, piston 42 is again retracted to raise finger members 54 to the inoperative position, thereby freeing the stock for subsequent longitudinal movement to an alternate position along the runoff table.

It is my intention to cover all changes and modifications of the invention herein chosen for purposes of disclosure which do not depart from the spirit and scope of the invention.

I claim:

1. Apparatus for fixing a plurality of substantially laterally adjacent elongated elements resting on a common longitudinal support comprising the combination of: a plurality of holding members overlying said support and spaced vertically therefrom, each said holding member being pivotally mounted for individual movement about a common shaft extending in a direction transverse to the length of said support; means for pivotally lowering said holding members about said shaft towards said support to an operative position in contact with said underlying elongated elements and the unoccupied portions of said support; means for exerting a downward force on some of the holding members in contact with said elongated elements, and means for pivotally raising said holding members about said shaft from said operative position to a raised inoperative position when movement of said elongated elements along said support is desired.

2. The apparatus as set forth in claim 1 wherein the center of gravity of each of said holding members is spaced laterally from the point of pivotal connection of said members to said common shaft, one end of each said member thus having a tendency to pivot about said shaft to said downwardly disposed operative position under the influence of gravity.

3. Apparatus for positively retaining a plurality of laterally adjacent elongated elements in fixed positions occupying a portion of a common longitudinal supporting surface, said apparatus comprising the combination of: a plurality of laterally adjacent holding members overlying said supporting surface, each said holding member mounted for independent pivotal movement about a common shaft extending transversely to the length of said supporting surface, said holding members when pivoted to their lowermost positions being in contact with said underlying elongated elements and any unoccupied portions of said supporting surface, pivotal means initially operable when pivoted in one direction to exert a downward force on the highest of said holding members in contact with said elongated elements, said pivotal means being subsequently operable when pivoted in a reverse direction to raise said holding members from said operative position to a raised inoperative position thus permitting subsequent movement of said elongated elements along said supporting surface.

4. The apparatus as set forth in claim 3 wherein said pivotal means is comprised of spaced link members pivotally mounted adjacent said holding members, said link members interconnected at their front and rear ends by first and second pressure bars and means for pivoting said link members in one direction in order to force said first pressure bar downwardly against the highest of said holding members in an operative position in contact with said elongated elements whereby pivotal movement of said link members in a reverse direction will result in said second pressure bar engaging and raising said holding members from said downwardly disposed operative position to said raised inoperative position.

5. The apparatus as set forth in claim 4 wherein said pivotal means is further characterized by a sleeve member covering said first pressure bar, said sleeve member being formed of any suitable resilient material to provide a means of evenly distributing the holding force being applied to the underlying holding members.

References Cited

UNITED STATES PATENTS

| | | | |
|---|---|---|---|
| 2,541,696 | 2/1951 | George | 269—267 X |
| 3,122,118 | 2/1964 | Cooper | 269—267 X |

ROBERT C. RIORDON, *Primary Examiner.*

E. SUTTON, *Assistant Examiner.*